United States Patent [19]

Yamada et al.

[11] Patent Number: 4,680,109
[45] Date of Patent: Jul. 14, 1987

[54] MEMBRANE SEPARATOR

[75] Inventors: Koichi Yamada, Tokyo; Ichiro Hiraiwa, Kanagawa; Shin Taniguchi, Tokyo; Toshinari Zengo, Kanagawa, all of Japan

[73] Assignee: Ebara Corporation, Tokyo, Japan

[21] Appl. No.: 744,008

[22] Filed: May 17, 1985

[51] Int. Cl.$^4$ ............................................. B01D 13/00
[52] U.S. Cl. .................................... 210/103; 210/137; 210/143; 210/416.1; 210/433.2
[58] Field of Search .................. 210/87, 90, 103, 107, 210/137, 143, 321.1, 416.1, 433.2, 652

[56] References Cited

U.S. PATENT DOCUMENTS

| | | | |
|---|---|---|---|
| 3,365,061 | 1/1968 | Bray | 210/130 |
| 3,405,058 | 10/1968 | Miller | 210/640 |
| 3,756,408 | 9/1973 | Spatz et al. | 210/96 |
| 4,113,614 | 9/1978 | Rollo et al. | 210/87 |
| 4,267,040 | 5/1981 | Schäl | 210/104 |
| 4,321,137 | 3/1982 | Kohler | 210/416.1 |
| 4,354,939 | 10/1982 | Pohl | 210/652 |

FOREIGN PATENT DOCUMENTS

| | | | |
|---|---|---|---|
| 0055981 | 7/1982 | European Pat. Off. | 210/652 |
| 1517921 | 3/1970 | Fed. Rep. of Germany | |
| 1571921 | 10/1972 | Fed. Rep. of Germany | |
| 2330445 | 1/1974 | Fed. Rep. of Germany | |
| 2444740 | 4/1976 | Fed. Rep. of Germany | 210/416.1 |
| 2627366 | 12/1977 | Fed. Rep. of Germany | |
| 2492470 | 4/1982 | France | |
| 57-4286 | 1/1982 | Japan | |
| 58-166904 | 10/1983 | Japan | |
| WO84/04049 | 10/1984 | Japan | 210/652 |
| 2088968 | 6/1982 | United Kingdom | 210/652 |

Primary Examiner—Peter Hruskoci
Attorney, Agent, or Firm—Oblon, Fisher, Spivak, McClelland & Maier

[57] ABSTRACT

This invention relates to a membrane separator which separates matters with a semipermeable membrane to obtain a dilute solution or a concentrated solution or both. In such a membrane separator, the most economical operation is attained by the condition in which the maximum amount of the desired solution is obtained by the minimum energy, that is, the required energy per unit amount of the solution obtained. Heretofore, the minimum power has been sought at the maximum pressure corresponding to the performance of the semipermeable membrane with the result that the required energy could not be minimized.

This invention provides a membrane separator having a flow rate controlling apparatus provided with a control circuit which uses a pump performance curve, a power recovering means performance curve, and the relationship between the concentration of the solute in a solution and the osmotic pressure of the solution to calculate the minimum required power at a predetermined dilute solution flow rate or concentrated solution flow rate. This invention is characterized in that the power recovering means performance curve is also taken into account. An embodiment of the invention comprises a means for detecting the flow rate of a feed solution, concentrated solution or dilute solution for the membrane separator and a control circuit for regulating a pressure regulating valve or the power recovering means in such a manner that the value indicated by the flow rate detecting means coincides with the theoretical flow rate in the system.

6 Claims, 7 Drawing Figures

MEMBRANE SEPARATOR

TECHNICAL FIELD

The present invention relates to a power-saving operation of a membrane separator

Prior Art

The essential part of a prior art membrane separator is arranged as shown in the flowsheet of FIG. 1. FIG. 1 shows an example of seawater desalinating systems. In FIG. 1, seawater which has been intaken through a water intake apparatus (not shown) and pre-treated is sucked into a high pressure centrifugal pump (hereinafter referred to as "pump") 1. The seawater is pumped out through the pump at an exhaust pressure $P_0$, with an exhaust amount $Q_0$ in a concentration $C_0$. The seawater thus pumped out passes through a pressure regulating valve 2 which is controlled by a pressure detector 2a. The seawater is then sent to one side of a semipermeable membrane 4 through a pressure measuring point 2' located upstream of the membrane 4. Membrane pressure $P_M$ developed at the surface of the membrane 4 makes plain water to pass through the membrane 4 against the osmotic pressure at a flow rate $Q_1$. The plain water is delivered to a water tank 6 through a flow meter 5. On the other hand, the seawater is concentrated by the membrane to a concentration $C_2$ and then fed to a turbine 7 at a pressure $P_2$ and a flow rate $Q_0 - Q_1 = Q_2$. An inlet nozzle 7' of the turbine has an opening which is controlled by an actuator 3. The energy obtained by the turbine 7 is used to help energize a pump drive motor 8.

In the above arrangement, the exhaust pressure $P_0$ of the pump 1 is generally 50 kg/cm$^2$ against an osmotic pressure of about 25 kg/cm$^2$ for seawater with an ordinary concentration. Thus, 20 to 40% of the exhaust pressure $Q_0$ of the pump 1 is desalinated through the membrane by reverse osmosis.

As shown in the above example, the membrane separator greatly depends on the power from the pump 1 in its operation. In order to recover part of the power, an attempt has been recently made to provide a power recovery turbine 7, e.g. Pelton wheel on the pipe for concentrated seawater from the membrane. However, the operation has been focused only on the dilute solution recovery. That is, a consideration has been made that the axis power of the pump 1 be minimized at the maximum allowable recovery of the semipermeable membrane 4.

DISCLOSURE OF THE INVENTION

As described in the foregoing paragraph, the prior art has been focused only on the dilute solute recovery so that the axis power of the pump is minimized at the maximum allowable recovery of the semipermeable membrane. As a result, the power recovered by the power recovering means has not been taken into account. Accordingly, the power consumed could not be generally minimized.

The object of the present invention is to provide a membrane separator with a flow rate controlling apparatus adapted to minimize the difference between the required power of the pump and the power recovered by the power recovering means.

The present invention is intended to provide a membrane separator with a controlling apparatus which uses the performance curve of the pump and the power recovering means to minimize the difference between the axis power and the power recovered, i.e. the motor required power, thus assurring the maximum efficiency for the most efficient semipermeable membrane apparatus.

The present invention provides a matter separator using a semipermeable membrane which has a flow rate controlling apparatus provided with a control circuit for calculating the minimum required power at a predetermined dilute or concentrated solution flow rate from a pump performance curve, a power recovering means, and the relationship between the concentration of the solute in the solution and the osmotic pressure of the solution.

The present invention provides a membrane separator having a pump for pressurizing feed solution, a pressure regulating valve disposed in a pipe between said pump and a semipermeable membrane, said semipermeable membrane, and a power recovering means disposed downstream of the semipermeable membrane at the concentrated solution side, which is adapted to obtain a dilute solution and a concentrated solution by separating the solute from the solution through the semipermeable membrane, said membrane separator having a flow rate controlling apparatus provided with a control circuit which calculates the minimum required power at a predetermined dilute or concentrated solution flow rate from a pump performance curve, a power recovering means performance curve, and the relationship between the concentration of the solute in the solution and the osmotic pressure of the solution.

The calculation of the minimum required power enables the unequivocal determination as one control system of the feed solution flow rate at an operation point for the minimum required power, the feed solution pressure, the concentrated solution flow rate, the concentrated solution pressure, the opening of a pressure regulating valve defining such flow rates and pressures, and the opening of the inlet valve of a power recovering means, e.g. turbine. Accordingly, when the pressure regulating valve and the turbine inlet valve are controlled in such a manner that their opening reach the values determined only by the calculation, the operation of the system can be conducted by the minimum required power. The membrane separator of the invention also may be provided with a pressure or flow rate detecting means as described hereinafter so that the pressure regulating valve and the power recovering means can be regulated in such a manner that the value detected by these detecting means becomes equal to the theoretical pressure or flow rate in the system.

In one embodiment, the membrane separator of the present invention comprises a pressure detecting means or flow rate detecting means provided in the pipe between said pump and said semipermeable membrane and a control circuit for regulating the opening of the pressure regulating valve and the power recovering means in such a manner that the value indicated by said pressure detecting means or flow rate detecting means becomes equal to the calculated value of the theoretical pressure or flow rate of the solution at an operation point.

In another embodiment, the membrane separator comprises a concentrated solution pressure detecting means provided between said semipermeable membrane and said power recovering means and a control circuit for controlling the power recovering means or the pressure regulating valve in such a manner that the value indicated by said pressure detecting means becomes equal to the calculated value of the theoretical pressure of the concentrated solution.

Another embodiment of the membrane separator comprises a concentrated solution flow rate detecting means provided between said semipermeable membrane and said power recovering means and a control circuit for controlling the power recovering means or the pressure regulating valve in such a manner that the value indicated by said flow rate detecting means becomes equal to the calculated value of the theoretical flow rate of the concentrated solution.

A further embodiment of the membrane separator comprises a flow rate detecting means provided downstream of said semipermeable membrane at the dilute solution side and a control circuit for controlling the pressure regulating valve or the power recovering means in such a manner that the value indicated by said flow rate detecting means becomes equal to the theoretical flow rate of the dilute solution in the system.

A further embodiment of the membrane separator comprises a membrane separator wherein said control circuit for calculating the minimum required power is provided with an allowable recovery rate setting apparatus so that it is capable of calculating the operation point at which the required power is minimized in the range below the allowable recovery rate of said semipermeable membrane.

As described above, the present invention has the effect of enabling a membrane separator provided with a power recovering means and a pump exhaust pressure regulating valve to diminish the power of the high pressure pump which occupies the majority of the power necessary for the separation by calculating the operation point for the minimum required power in the operation range of the apparatus from the pump and power recovering means performance curves and the relationship between the concentration of the solute in the solution and the osmotic pressure of the solution.

The embodiments of the invention are provided with a pressure detecting means or flow rate detecting means disposed in each pipe for solutions to be treated or solutions treated so that the pressure regulating valve or the power recovering means can be regulated in such a manner that the value indicated by said pressure detecting means or flow rate detecting means becomes equal to the theoretical pressure or flow rate in the system. Thus, the present invention enables a membrane separator to make a simple, accurate control only by adding detecting and controlling means thereto.

DETAILED DESCRIPTION OF THE DRAWINGS

PREFERRED EMBODIMENTS OF THE INVENTION

Figure 1:
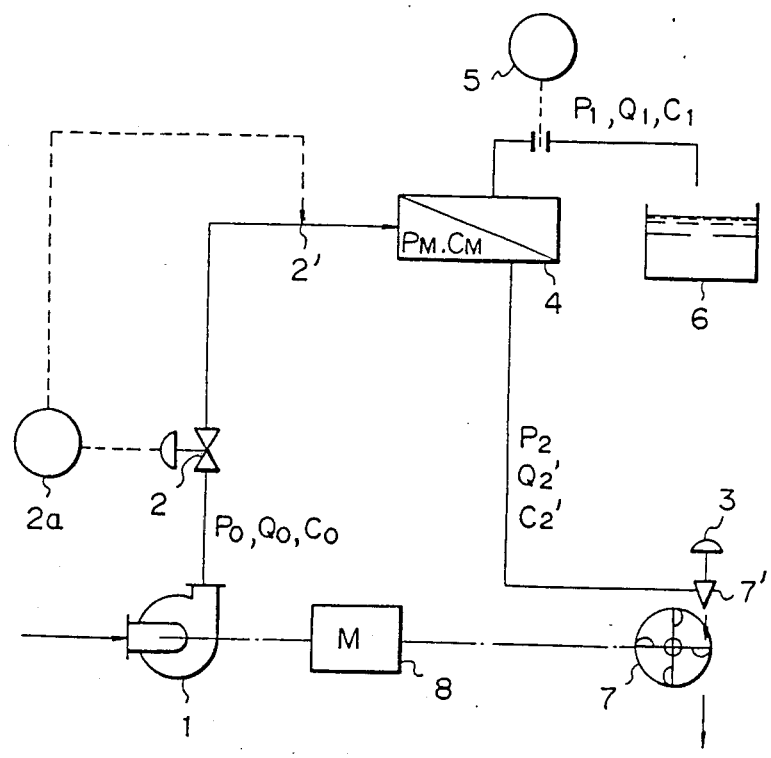
FIG. 1 shows a flowsheet of a membrane separator.

The description of the embodiments of the present invention will be preceded by that of the power of a membrane separator. The axis power of the pump 1, the power recovered by the turbine 7 and the required power of the motor 8 will be described hereunder.

The pump power LP is given by the following equation:

$$LP = Q_0 P_0 / \eta_P$$
$$= (Q_1 + Q_2)(P_M + P_{L1}) / \eta_P$$
$$= Q_1 P_M / \eta_P + Q_1 P_{L1} / \eta_P + Q_2 P_{L1} / \eta_P + Q_2 P_M / \eta_P$$

wherein $\eta_P$ is the efficiency of the pump 1; and $P_{L1}$ is the pressure loss along the pipe from the pump 1 to the membrane 4 through the pressure regulating valve 2.

The power $L_T$ recovered by the turbine 7 is given by the equation:

$$L_T = Q_2 P_2 \eta_T$$
$$= Q_2 (P_M - P_{L2}) \eta_T$$
$$= Q_2 P_M \eta_T - Q_2 P_{L2} \eta_T$$

wherein $\eta_T$ is the efficiency of the turbine 7; and $P_{L2}$ is the pressure loss along the pipe from the membrane 4 to the inlet nozzle 7' of the turbine 7.

Accordingly, the required power of the motor L is given by the equation:

$$L = L_P - L_T$$
$$= Q_1 P_M / \eta_P + (Q_1 P_{L1} / \eta_P + Q_2 P_{L1} / \eta_P + Q_2 P_{L2} \eta_T) +$$
$$(Q_2 P_M / \eta_P - Q_2 P_M \eta_T)$$
$$= L_W + L_{VL} + L_{ML}$$

$$L_W = Q_1 P_M / \eta_P$$

$$L_{VL} = Q_1 P_{L1} / \eta_P + Q_2 P_{L1} / \eta_P + Q_2 P_{L2} \eta_T$$

$$L_{ML} = Q_2 P_M / \eta_P - Q_2 P_m \eta_T$$

Figure 2:
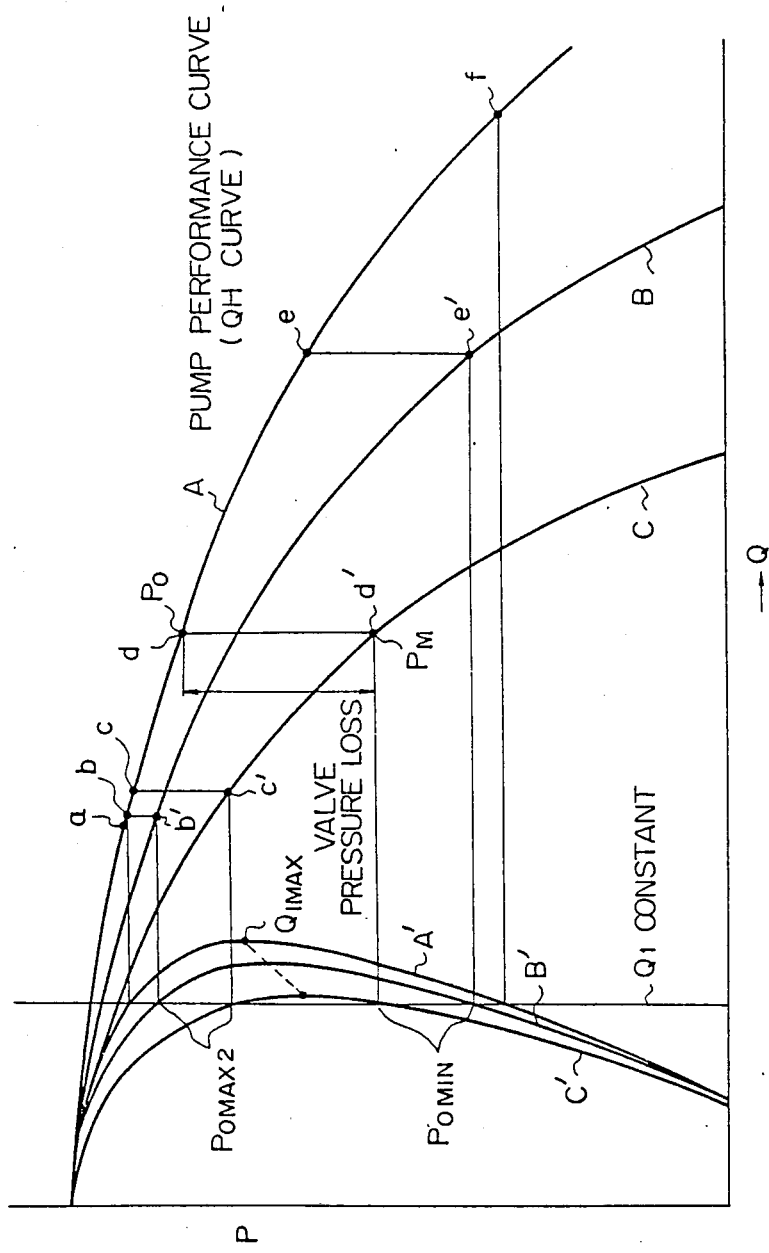
FIG. 2 shows a diagram illustrating the relationship between the pressure and the flow rate of the membrane separator.

FIG. 2 shows a diagram illustrating the relationship between the valve pressure loss by the pressure regulating valve and the flow rate and other characteristics of the dilute solution (plain water), with pressure P as ordinate and flow rate as abscissa. The curve A represents the performance curve (Q - H curve) of the pump 1. The curves B and C each represents the relationship between the membrane pressure $P_M$ and the rate $Q_0$ of flow to the membrane when the pressure regulating valve 2 is throttled. The curve C represents the status when the valve 2 is further throttled as compared to the curve B.

For the relationship between the flow rate $Q_1$ of the dilute solution and the membrane pressure $P_M$, the curves corresponding to the curves A, B and C are given by the curves A', B' and C', respectively. If the system pressure is reduced down by operating the pressure regulating valve 2 also with the flow rate $Q_2$ kept constant, the operation point of the pump 1 moves in the order of a, b, c, d, e and f and the operation point of the membrane moves in the order of a, b', c', d', e' and f. For example, the ordinate difference between the exhaust pressure $P_0$ of the pump 1 at the point d on the pump performance curve A and the membrane pressure $P_M$ at the point d' on the curve C when the pressure regulating valve 2 is throttled represents the valve pressure loss by the pressure regulating valve 2. However, the pressure regulating valve 2 is fully open and thus gives no valve pressure loss at the operation points a and f.

Let us here determine the relationship between the opening of the pressure regulating valve 2 and the required power L of the motor when the flow rate $Q_1$ of the dilute solution is kept constant. The desalination power $L_W$ required for the production of plain water assumes a large value in the vicinity of the cutoff pressure of the pump 1 (since $Q_0$ is small, the recovery rate of the membrane 4 is high) because the membrane pressure $P_M$ is high and the efficiency $\eta_P$ of the pump 1 is small in this region. As the pressure of the pump 1 is reduced down, the membrane pressure $P_M$ becomes smaller and the efficiency $\eta_P$ of the pump 1 becomes larger, thus reducing the desalination power $L_W$. However, since the efficiency $\eta_P$ of the pump 1 has a maximum value and reduces down in low pressure and high flow rate regions, the desalination power $L_W$ again increases.

The resistance along the pipe contributes to the power $L_{VL}$ as the pressure loss along the passage much less than the resistance by the pressure regulating valve 2. The valve pressure loss by the pressure regulating valve 2 is zero in the vicinity of the cutoff pressure. As the pump pressure increases, the valve pressure loss increases and then decreases to become zero again. That is, the valve pressure loss has a maximum.

Figure 3:
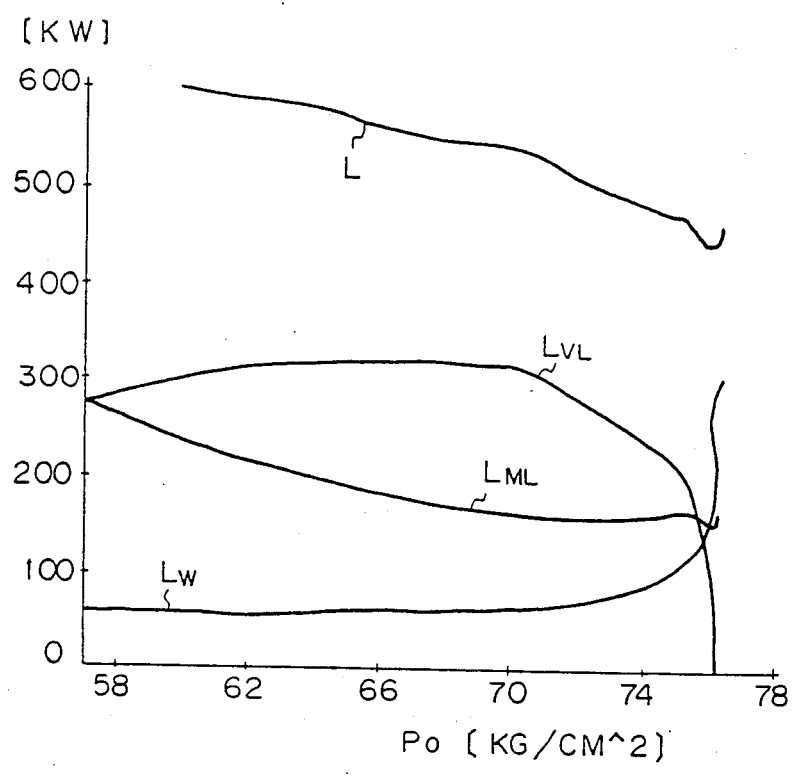
FIGS. 3 to 5 show diagrams illustrating the required power and the power loss of the membrane separator.
Figure 4:
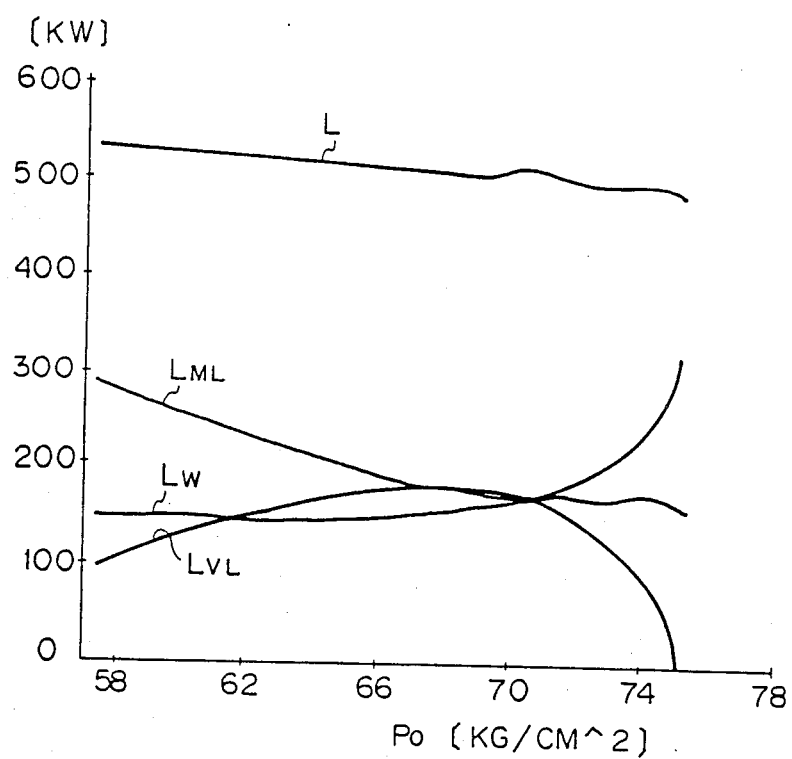
Figure 5:
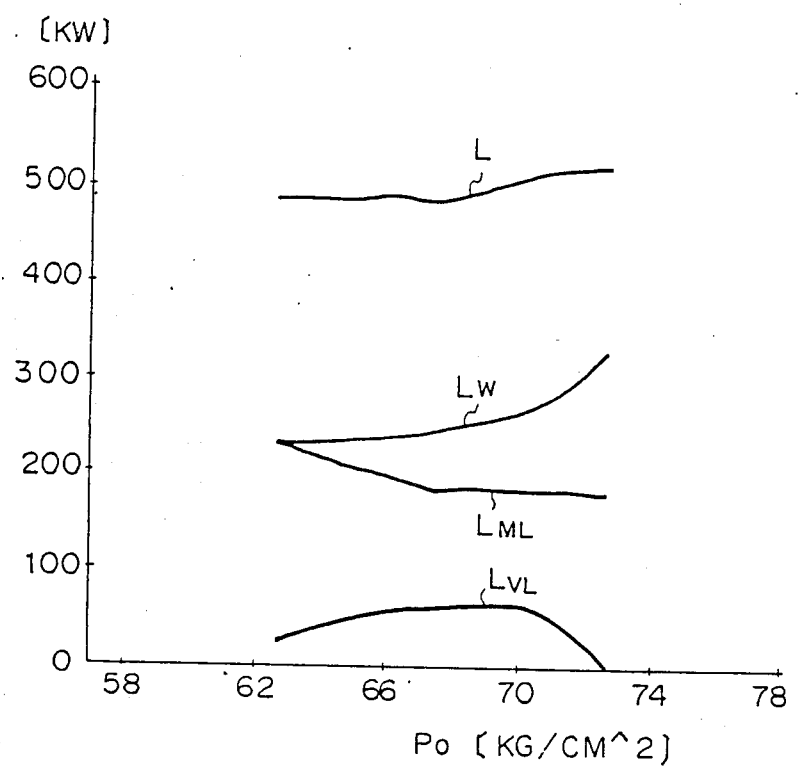

The power loss $L_{ML}$ due to the efficiency of the pump 1 and the turbine 7 is the combination of the efficiency curve characteristic to the type of the pump 1 and the turbine 7. The power loss $L_{ML}$ becomes small in the vicinity of the maximum efficiency point of the pump 1 and the turbine 7 and larger as the pressure becomes higher or lower than this point. As explained above, none of the desalination power $L_W$, the power $L_{VL}$ as the pressure loss along the passage and the power loss $L_{ML}$ due to the efficiency of the pump turbine has a simple proportional relationship with the pressure (i.e. recovery rate). Some examples are shown in FIGS. 3, 4 and 5. In these figures, the pressure is plotted as abscissa and the power as ordinate.

In FIG. 3, the required power L of the motor 8 becomes smaller as the exhaust pressure $P_0$ of the pump 1 and the recovery become higher.

In FIG. 4, the required power L of the motor 8 keeps approximately constant, regardless of the recovery rate.

In FIG. 5, as the recovery rate (i.e. pressure) becomes lower, the required power L of the motor 8 becomes smaller, thus saving power.

As shown in FIGS. 3, 4 and 5, the desalination power $L_W$ becomes higher in the region of low pressure at high flow rate and in the region of high pressure and thus has a minimum at intermediate recovery rate.

The power loss $L_{VL}$ as the pressure loss along the passage increases and then decreases as the exhaust pressure $P_0$ of the pump 1 increases so that it has a maximum point. The power loss $L_{ML}$ due to the efficiency of the pump 1 and the turbine 7 tends to become lower, thus decreasing the decrement together with the decrease in the exhaust pressure of the pump 1.

An embodiment of the present invention will be described hereunder with reference to a control bloc diagram of FIG. 6.

A dilute solution is inputted to a dilute solution flow rate setting apparatus 10 in a flow rate $Q_1$. The maximum allowable recovery rate $R_{MAX}$ is determined by an allowable recovery rate setting apparatus 11.

The maximum allowable recovery rate $R_{MAX}$ as the output of the allowable recovery rate setting apparatus 11 and the dilute solution flow rate $Q_1$ as the output of the dilute solution flow rate setting apparatus 10 are inputted to a minimum solution supply calculator 12 which in turn calculates the minimum solution supply $Q_{0MIN} = Q_1/R_{MAX}$. $Q_{0MIN}$ thus calculated is inputted to a function generator 13 in which the function of the pump performance curve A has previously been stored. The function generator 13 then outputs the maximum exhaust pressure $P_{0MAX1}$ corresponding to the minimum solution supply $Q_{0MIN}$. The maximum exhaust pressure $P_{0MAX1}$ is inputted to a maximum pressure calculator 14.

The maximum exhaust pressure $P_{0MAX2}$ corresponding to the flow rate $Q_1$ is determined from the dilute solution flow rate $Q_1$. Let us here let alone FIG. 6 to describe the process for determining the exhaust $Q_0$ fed to the membrane from the dilute solution flow rate $Q_1$ as follows:

(1) The exhaust pressure $P_0$ of the pump 1 is assumed to be in some value. Once the value of the pump exhaust pressure $P_0$ is set, the exhaust $Q_0$ of the pump 1 can be determined from the pump performance curve A.

(2) Since $Q_2 = Q_0 - Q_1$, $Q_2$ can be determined by subtracting the predetermined value of $Q_1$ from $Q_0$ determined in Clause (1).

(3) The relationship between the osmotic pressure $\pi$ and the seawater concentration $C_M$ is unequivocal. The solution concentration $C_M$ at the supply side of the membrane 4 can be approximately determined by the equation:

$$C_M \approx (C_0 + C_2)/2$$

wherein $C_0$ is the solution concentration at the inlet of the membrane chamber and $C_2$ the concentration of the concentrated solution. $C_0$ and $C_2$ can be applied to the above approximation unless the recovery $Q_1/Q_0$ shows a remarkable change. Accordingly, $C_0$ and $C_2$ can be considered constants especially when the apparatus is in normal operation. This relationship enables the osmotic pressure $\pi_M$ to be determined. (4) When the supplied seawater makes a remarkable temperature change, a temperature detector for detecting the temperature of the solution in the pipe at the supply side is provided, whereby the coefficient K is calculated by the equation:

$$K = K_0 (D_W/T)$$

wherein

K: constant defined by the type of the membrane

DW: diffusion coefficient of the water in the membrane

T: temperature of the fed solution.

If the temperature change of the supplied solution is small, K can be considered a constant. (5) The pressure $P_M$ at the supply side of the membrane 4 is determined by subtracting the head loss $P_L$ along the pipe at the supply side of the membrane 4 including the fluid pressure regulating valve 2 from the exhaust pressure $P_0$ of the pump 1 set in Clause (1). Since the pressure $P_1$ at the dilute side of the membrane 4 is nearly constant and the concentration of the dilute solution can be considered constant, the osmotic pressure $\pi_1$ of the dilute solution can be determined to be constant. This enables the reverse osmotic pressure $\Delta P$ to be calculated as follows:

$$\Delta P = (P_M - P_1) - (\pi_M - \pi_1)$$

(6) The dilute solution flow rate $Q_l$, *if the area of the membrane is $A_M$*, can be represented by the equation:

$$Q_1 = A_M K \Delta P \quad (1)$$

The dilute solution flow rate $Q_1$ shows a linear proportion such that the flow rate at the dilute side of the membrane 4 is changed by the pressure $\Delta P$ beyond the osmotic pressure. $Q_1$ calculated by Equation (1) is defined as $Q_{1CALC}$.

(7) The predetermined value of $Q_1$ is compared to $Q_{1CALC}$. If the error is large, the process is returned to Clause (1) where the pump exhaust pressure $P_0$ is again assumed to be in some value. The process from Clause (1) to Clause (7) is repeated in a loop until the error between $Q_1$ and $Q_{1CALC}$ becomes equal to Equation (1).

Specifically, if the pressure $P_0$ assumed in Clause (1) to be in some value reaches $Q_{1CALC} - Q_1 > 0$ in a smaller range than the exhaust pressure $P_{01}$ of the pump 1 corresponding to the maximum dilute solution flow rate $Q_{1MAX}$ as shown in FIG. 2, the reassumed value of $P_0$ is set smaller than the initially assumed value of $P_0$. If it reaches $Q_{1CALC} - Q_1 < 0$ in the same condition, the reassumed value of $P_0$ is set larger than the initially assumed value of $P_0$.

If the exhaust pressure $P_0$ of the pump 1 initially assumed in Clause (1) to be in some value reaches $Q_{1CALC} - Q_l > 0$ in a larger range than the exhaust pressure $P_{01}$ of the pump 1 corresponding to the dilute solution flow rate $Q_{1MAX}$, the reassumed value of $P_0$ is set larger than the initially assumed value of $P_0$. If it reaches $Q_{1CALC} - Q_1 < 0$ in the same condition, the reassumed value of $P_0$ is set smaller than the initially assumed value of $P_0$.

(8) If the calculated error as the difference between the predetermined value of the dilute solution flow rate $Q_1$ and the value of $Q_{1CALC}$ calculated in Clauses (1) to (7) is within the tolerance, the assumed value of the pump exhaust pressure $P_0$ is defined as correct. If the value of the dilute solution flow rate $Q_1$ is predetermined, the relationship between the exhaust pressure $P_0$ of the pump 1 and the dilute solution flow rate $Q_1$ can be unequivocally determined because the performance curve of the pump 1 is established and the relationship between the concentration and the osmotic pressure of the solution is established by the type of the solution. Accordingly, the above procedure of Clauses (1) to (7) can be summarized into a numerical table.

In addition, for the same value of the dilute solution flow rate $Q_1$, two kinds of value of the exhaust pressure $P_0$ of the pump 1 can be determined as shown in FIG. 2. The higher of the two values is defined as $P_{0MAX2}$ and the lower $P_{0MIN}$.

Figure 6:
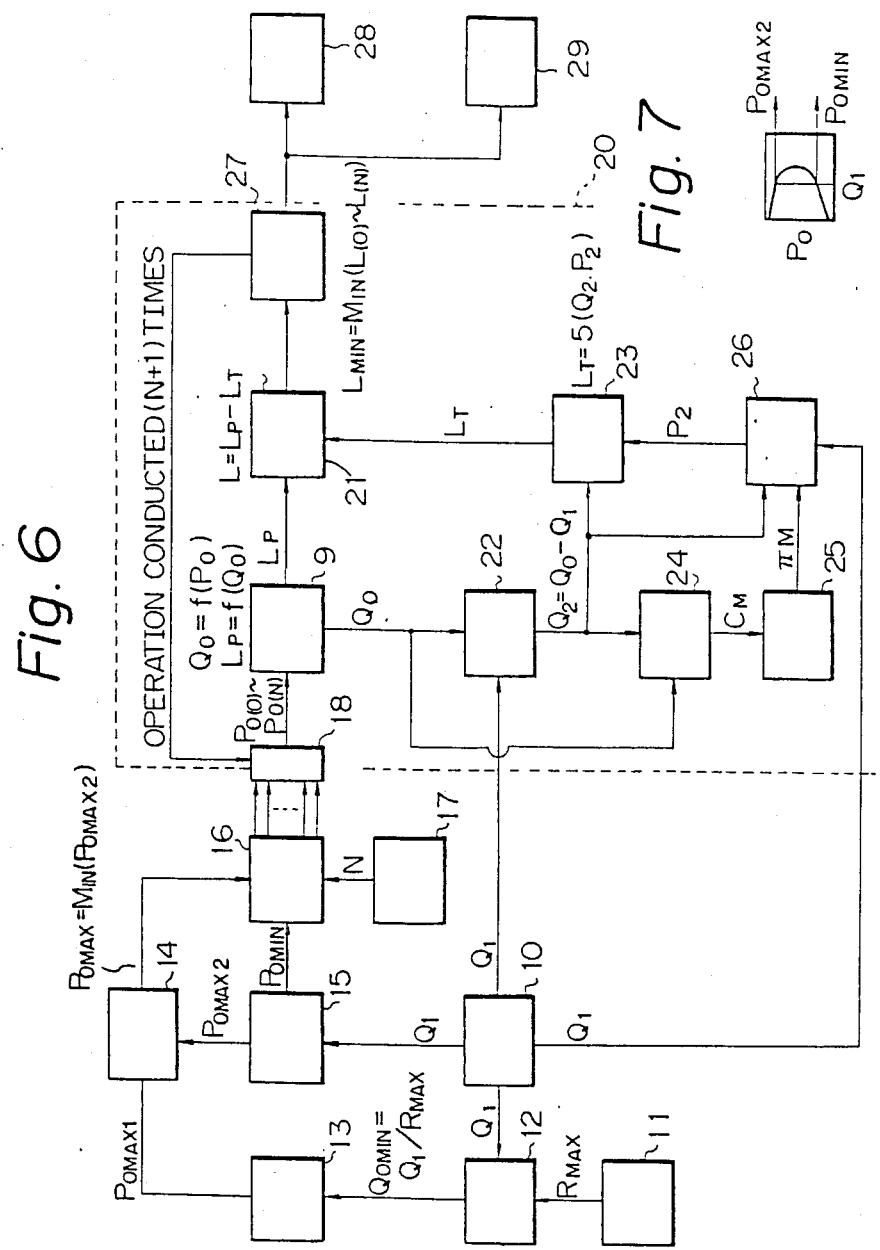
FIG. 6 shows a bloc diagram of an embodiment of the present invention.
Figure 7:
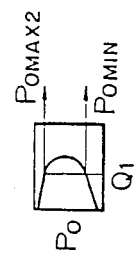
FIG. 7 shows a diagram of one bloc of FIG. 6.

Let us return to the description of FIG. 6. The output of the dilute solution flow rate setting apparatus 10 is inputted to a $P_0 - Q_1$ function generator 15. The function generator 15 stores a diagram or a corresponding numerical table illustrating the QH curve of the dilute solution as shown in FIG. 7 with the dilute solution flow rate as abscissa and the exhaust pressure $P_0$ of the pump 1 as ordinate so that when the dilute solution flow rate $Q_1$ is inputted, it outputs the exhaust pressures $P_{0MAX2}$ and $P_{0MIN}$ of the pump 1. The maximum pump exhaust pressure $P_{0MAX2}$ is inputted to the maximum pressure calculator 14. The exhaust pressure $P_{0MAX1}$ of the pump 1 determined from the pump performance curve is the maximum pressure determined by the characteristics of the membrane 4 while the exhaust pressure $P_{0MAX2}$ of the pump 1 determined from the relationship between the dilute solution flow rate $Q_1$ and the exhaust of the pump 1 is that determined by the pump performance. Therefore, the maximum pressure allowed for the apparatus is the smaller of $P_{0MAX1}$ and $P_{0MAX2}$. The maximum pressure calculator 14 compares $P_{0MAX1}$ with $P_{0MAX2}$ and outputs the smaller as $P_{0MAX}$.

The pressure $P_{0MAX}$ as the output of the maximum pressure calculator 14 and the pressure $P_{0MIN}$ as the output of the $P_0 - Q_1$ function generator 15 are inputted to an exhaust pressure calculator 16. Furthermore, an operation interval N predetermined by an operation interval setting apparatus 17 is inputted to the exhaust pressure calculator 16 so that $P_{0MIN} - P_{0MAX}$ is divided at regular intervals (one interval: $1/N$), whereby the following calculations are conducted:

$$P_0(0) = (0/N)(P_{0MAX} - P_{0MIN}) + P_{0MIN}$$

$$P_0(1) = (1/n)(P_{0MAX} - P_{0MIN}) + P_{0MIN}$$

$$P_0(N) = (N/N)(P_{0MAX} - P_{0MIN}) + P_{0MIN}$$

These results are inputted to a multiplexer 18. When receiving $P_0(O)$ to $P_0(N)$ outputted in sequence from the multiplexer 18, a pump performance curve/pump power function generator 19 outputs the exhaust $Q_0 = f(P_0)$ corresponding to the pressures $P_0(O)$ to $P_0(N)$ thus inputted and the required power $Q_0 = f(P_0)$ of the pump 1 corresponding to the pump exhaust $Q_0$. The pump power $L_P$ is inputted to a motor required power calculator 21. The exhaust $Q_0$ of the pump 1 from the pump performance curve/pump power function generator 19 is inputted to a concentrated solution flow rate calculator 22.

The concentrated solution flow rate calculator 22 calculates the concentrated solution flow rate $Q_2 = Q_0 - Q_1$ from the dilute solution flow rate $Q_1$ inputted from the dilute solution flow rate setting apparatus 10 and sends the concentrated solution flow rate $Q_2$ as its output to a performance curve function generator 23 for the turbine 7 and a concentration calculator 24. The concentration calculator 24 receives as an input the exhaust $Q_0$ of the pump 1 from the pump performance curve/power characteristic curve function generator 19 so that it calculates the concentration of the concentrated solution $C_2 = C_{0x}Q_0/Q_2$ to give the concentration at the membrane surface $C_M = (C_0 + C_2)/2$ as its output which is then inputted to an osmotic pressure function generator 25. The function generator 25 calculates the osmotic pressure $\pi_M$ from the osmotic pressure function $\pi_M = f(C_M)$ and inputs it to the pressure calculator 26. The pressure calculator 26 receives as inputs the concentrated solution flow rate $Q_2$ from the concentrated solution flow rate calculator 22 and the dilute solution flow rate $Q_1$ from the dilute solution flow rate setting apparatus 10 so that it calculates the pressure at the membrane surface as follows:

$$P_M = Q_1/A_M \cdot K + \pi_M$$

Furthermore, the head loss $P_{L2}$ along the pipe from the membrane 4 to the inlet nozzle 7' of the turbine 7 is determined from the equation:

$$P_{L2} = a_1 \times (Q_2/Q_R)^2$$

wherein
 $a_1$: constant determined by the pipe
 $Q_R$: specified flow rate of the pipe.

Thus, the concentrated solution pressure $P_2 = P_M - P_{L2}$ is the pressure of the solution supplied to the turbine 7. The resulting concentrated solution pressure $P_2$ is outputted from the pressure calculator 26 and inputted to the turbine performance curve function generator 23. The function generator 23 calculates the power generated by the turbine $L_T = f(Q_2, P_2)$ from the concentrated solution pressure $P_2$ together with the concentrated solution flow rate $Q_2$ already inputted thereto and outputs it. The power $L_T$ is inputted to the above motor required power calculator 21.

The motor required power calculator 21 determines the required power L of the motor 8 by subtracting the power $L_T$ recovered by the turbine 7 from the required power $L_P$ of the pump 1 already inputted thereto and sends it to a minimum power calculator 27. The minimum power calculator 27 stores $L(i) : i = 0, 1, 2 \ldots N$ as inputted thereto, sends a select signal to the multiplexer 18 and determines $L(i+1)$ in the same manner as above. The motor required power series L(O) to L(N) is then calculated to determine the minimum power $L_{MIN}$. The operation is repeated (N+1) times in the control bloc 20 surrounded by the broken line until the minimum power $L_{MIN}$ is determined.

The exhaust $Q_0$ and the exhaust pressure $P_0$ of the pump 1 which has the minimum power $L_{MIN}$ thus calculated by the minimum power calculator 27 can be determined by a membrane inlet valve opening calculator 28 using the equation:

$$P_{L1} = P_0 - P_M = P_{L1V} + P_{L1P}$$

wherein
 $P_{L1V}$ pressure loss by the pressure regulating valve 2
 $P_{L1P}$ pressure loss along the passage.

Since $P_{L1P}$ can be determined by the equation $P_{L1P} = a_1(Q_0/Q_R)^2$ wherein $Q_R$ is the specified flow rate and $a_1$ a constant, $P_{1L1V}$ can be determined by the equation:

$$P_{1L1V} = P_{L1} - P_{L1P}.$$

The flow rate coefficient CV of the pressure regulating valve 2 is determined by the equation:

$$C_V = K'Q_0 / \sqrt{P_{L1V}}$$

wherein K': constant.

Since $Q_0$ has already been determined, the opening of the pressure regulating valve 2 can be determined by the equation:

$$A_{V1} = f(C_V)$$

Such an operation is conducted so that the opening $A_{V1}$ is outputted, whereby the valve stroke is regulated by a servo mechanism not shown.

The turbine inlet valve opening calculator 29 determines the opening $A_{V2}$ of the turbine inlet valve 3 from the pressure $P_2$ and the flow rate $Q_2$ of the concentrated solution corresponding to the minimum power $L_{MIN}$ calculated at the minimum power calculator 27 by the equation:

$$A_{V2} = Q_2/\alpha \sqrt{2gP_2}$$

wherein
 α: constant
 g: acceleration of gravity.

Thus, $A_{V2}$ is outputted from the turbine inlet valve opening calculator 29 to regulate the valve stroke of the nozzle 7' via a servo mechanism not shown.

While the preferred embodiment is arranged such that the valve opening $A_{V1}$ as the output of the membrane inlet valve opening calculator 28 of FIG. 6 is controlled by regulating the valve stroke of the pressure regulating valve 2 via a servo mechanism, the pressure regulating valve 2 may be controlled by the pressure detector 2a in such a manner that the pressure $P_M$ at the pressure measuring point 2' coincides with the calculated value.

Furthermore, while the preferred embodiment is arranged such that the valve stroke of the turbine inlet nozzle 7' is regulated by the valve opening $A_{V2}$ as the output of the turbine inlet valve opening calculator 29 of FIG. 6, a pressure detector (not shown) for detecting the concentrated solution pressure $P_2$ may be provided between the membrane 4 and the power recovering means. With such an arrangement, the power recovering means can be controlled by the pressure detector in such a manner that the pressure $P_2$ detected by the pressure detector coincides with the concentrated solution pressure $P_2$ at the minimum power $L_{MIN}$.

The pressure detector 2a may be provided in the feed solution pipe or a pressure detector (not shown) may be provided in the concentrated solution pipe so that the pressure regulating valve or the power recovering means is controlled to generate the minimum power or flow rate. That is, the system of the present invention may be arranged such that a means for detecting the flow rate through the pipe from the pump 1 to the membrane 4 is provided, whereby the pressure regulating valve 2 and the power recovering means are regulated so that the flow rate of the feed solution detected by the flow rate detecting means reaches the value corresponding to the minimum power. Alternately, the system of the present invention may be arranged such that a means for detecting the flow rate through the concentrated solution pipe from the membrane 4 to the power recovering means is provided, whereby the pressure regulating valve 2 and the power recovering means are regulated so that the flow rate of the concentrated solution detected by the flow rate detecting means reaches the value corresponding to the minimum power.

INDUSTRIAL APPLICABILITY

While the present invention is suitable especially for the use requiring a large power, such as seawater desalination, it can also be applied to the concentration of chemicals, foods, etc.

We claim:
1. A membrane separator provided with a pump for pressurizing a feed solution, a semipermeable membrane, a pressure regulationg valve disposed in a pipe between said pump and semipermeable membrane, and a power recovering means disposed downstream of the semipermeable membrane at the concentrated solution side, which is adapted to obtain a dilute solution and a concentrated solution by separating the solute from the solution through the semipermeable membrane, said membrane separator having:

a flow rate controlling apparatus provided with a control circuit which calculates an operation point including theoretical pressure values and theoretical flow rate values from the solute concentration and osmotic pressure in the feed solution and the minimum required power at a predetermined dilute or concentrated solution flow rate from a performance curve of the pump, a performance curve of the power recovery means, and the relationship between the concentration of the solute and osmotic pressure in the feed solution;

specific pressure and flow rate detecting means which provide specific values to said control circuit to perform the calculations;

a means for regulating said pressure regulating valve in response to the calculated values produced by said control circuit; and a means for regulating said power recovery means in response to the calculated valves produced by said control circuit to minimize the difference between the required power of the pump and the power recovered by the power recovering means.

2. A membrane separator according to claim 1, wherein said operation point includes a theoretical pressure value of said feed solution and said specific pressure detecting means is provided in the pipe between said pump and said semipermeable membrane, and wherein the opening of said pressure regulating valve and said power recovering means are regulated in such a manner that the value indicated by said specific pressure detecting means becomes equal to the theoretical pressure value of said feed solution in the system at the calculated operation point.

3. A membrane separator according to claim 1, wherein said operation point includes a theoretical flow rate value of said feed solution and said specific flow rate detecting means is provided in the pipe between said pump and said semipermeable membrane, and wherein the opening of said pressure regulating valve and said power recovering means are regulated in such a manner that the value indicated by said specific flow rate detecting means becomes equal to the theoretical flow rate value of said feed solution in the system at the calculated operation point.

4. A membrane separator according to claim 1, wherein said operation point includes a theoretical pressure value of said concentrated solution, said membrane separator comprising a concentrated solution pressure detecting means provided between said semipermeable membrane and said power recovering means, and a means for controlling said power recovering means or said pressure regulating valve in such a manner that the value indicated by said pressure detecting means becomes equal to the theoretical pressure value of the concentrated solution in the system at the calculated operation point.

5. A membrane separator according to claim 1, wherein said operation point includes a theoretical flow rate value of said concentrated solution, said membrane separator comprising a concentrated solution flow rate detecting means provided between said semipermeable membrane and said power recovering means, and a means for controlling said power recovering means or said pressure regulating valve in such a manner that the value indicated by said flow rate detecting means becomes equal to the theoretical flow rate value of the concentrated solution in the system at the calculated operation point.

6. A membrane separator according to claim 1, wherein said operation point includes a theoretical flow rate value of said dilute solution, said membrane separator comprising a flow rate detecting means provided downstream of said semipermeable membrane at the dilute solution side, and a means for controlling said pressure regulating valve or said power recovering means in such a manner that the value indicated by said flow rate detecting means becomes equal to the theoretical flow rate value of the dilute solution in the system at the calculated operation point.

* * * * *